United States Patent [19]

Bettin et al.

[11] 4,337,959

[45] Jul. 6, 1982

[54] SELF-LEVELING AND HEIGHT CONTROL HYDRAULIC SYSTEM

[75] Inventors: Leonard A. Bettin, Lyons; William C. Swanson, Clarendon Hills, both of Ill.

[73] Assignee: International Harvester Co., Chicago, Ill.

[21] Appl. No.: 156,896

[22] Filed: Jun. 5, 1980

[51] Int. Cl.³ ............................................. A01B 63/22
[52] U.S. Cl. ................................. 280/43.23; 91/515; 137/99; 172/401; 172/413
[58] Field of Search ............... 280/43.23, 43.17, 43.13; 172/2, 4, 413, 401, 406; 91/514, 515, 517, 518, 532; 60/420, 374; 137/99

[56] References Cited

U.S. PATENT DOCUMENTS 3,065,602  11/1962  Curlett ............................. 60/420 X
3,154,925  11/1964  De Vita ............................. 91/517
3,495,610  2/1970  Van Aken ........................... 137/99
4,221,266  9/1980  Fardal ................................. 172/4

FOREIGN PATENT DOCUMENTS 792519  8/1968  Canada ............................. 172/401

Primary Examiner—John A. Pekar
Attorney, Agent, or Firm—J. W. Gaines; F. D. Au Buchon

[57] ABSTRACT

An implement having a rotary flow divider controlling fluid to and from at least two independent hydraulic rams for raising and lowering the implement in a level manner. A counter totals the revolutions of the flow divider and actuates an electrical circuit which controls solenoid valves to stop the implement at the proper height.

5 Claims, 2 Drawing Figures

SELF-LEVELING AND HEIGHT CONTROL HYDRAULIC SYSTEM

BACKGROUND AND SUMMARY OF THE INVENTION

This invention relates to a hydraulic system for an agricultural or farm implement, e.g. a planter, and more particularly to such a system which will automatically control certain functions or sequences of and/or for the implement.

The operation of an agricultural implement, particularly the large trail-behind type, in the field requires the constant attention of the operator seated on the tractor coupled to that implement. The direction and speed of the tractor must be controlled precisely for maximum efficiency. However, reversing directions at the end of a pass places a large burden on the operator, especially with a planter where markers must be raised and lowered, the tractor-planter combination turned, often through 180°, the planter mechanism raised and lowered, and these operations must be performed quickly and with a high degree of precision.

It is, therefore, an object of this invention to provide a hydraulic system for an implement which is self-leveling and which provides automatic height control.

It is another object to provide such a hydraulic system which is capable of performing certain operations on the implement automatically and which will minimize the attention of, and exercise of judgment and skill by the operator in controlling the implement per se.

These and other objects of the present invention, and many of the attendant advantages thereof, will become more readily apparent upon a perusal of the following description and the accompanying drawings wherein:

FIG. 1 is a hydraulic and mechanical schematic of an implement incorporating a preferred embodiment of the invention; and FIG. 2 is a similar schematic, of another embodiment of the invention.

DESCRIPTION OF PREFERRED EMBODIMENTS

Figure 1:
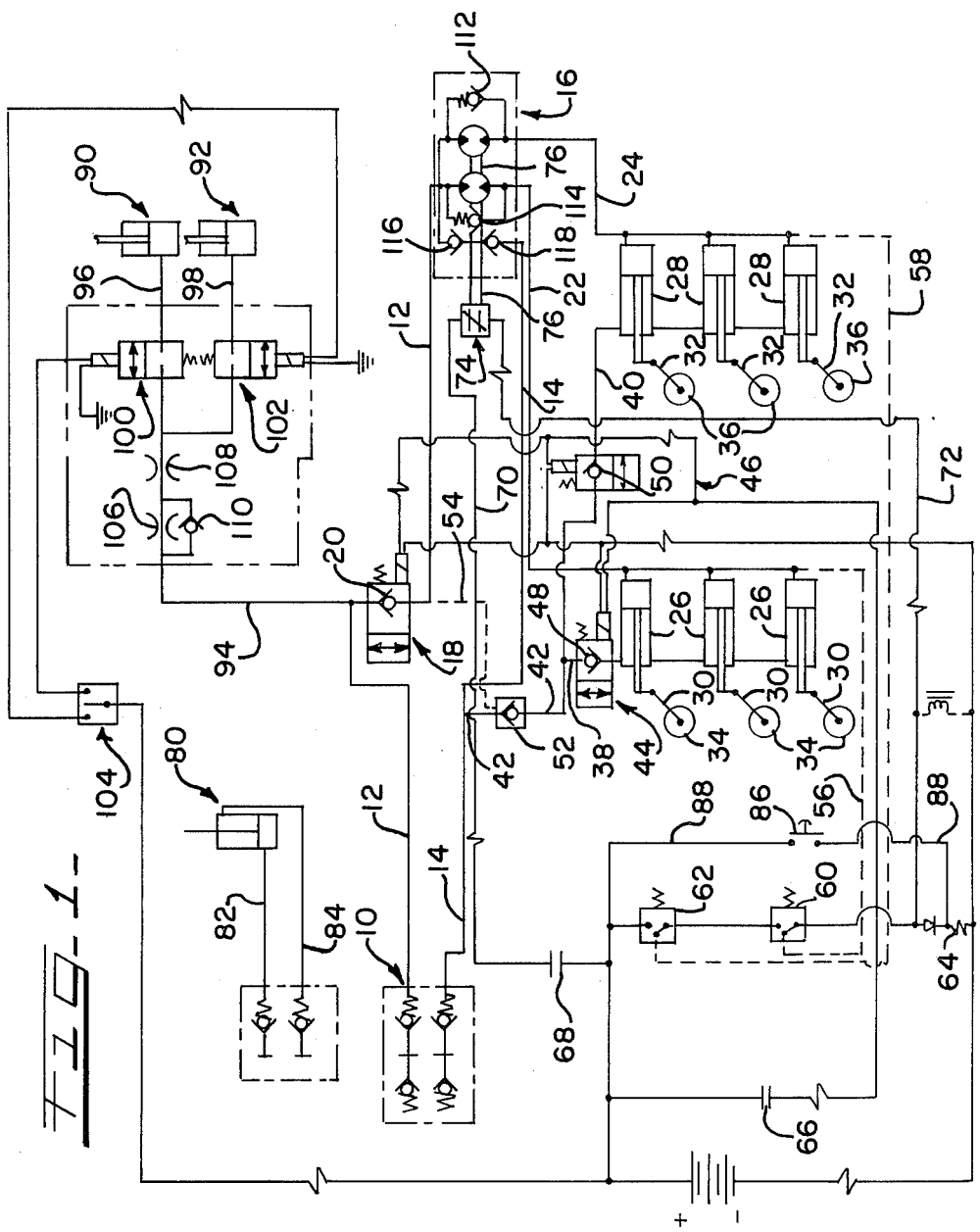

Referring now to FIG. 1, the hydraulic connection to the tractor, not shown, is through a conventional hydraulic coupler, indicated generally at 10, with which conduits 12 and 14 communicate. The tractor has a conventional hydraulic system which basically includes a reservoir, a pump and a directional control valve movable by an operator in the tractor. Movement of the control valve from its center neutral position will selectively connect one of the conduits 12 and 14 with the pump to receive hydraulic fluid under pressure while simultaneously connecting the other conduit to reservoir. To raise the implement, pressure is directed through conduit 12, and conduit 14 is connected to reservoir. The conduit 12 extends to and communicates with a rotary flow divider, indicated generally at 16. A solenoid valve 18 is interposed in conduit 12 and in its de-energized position, as shown in FIG. 1, positions a check valve 20 in conduit 12 and permits flow only toward the flow divider 16. The rotary flow divider 16 divides the flow equally into conduits 22 and 24, which conduits connect with the head end of rams 26 and 28. Pressure in the head ends will cause the pistons and affixed rods to extend, rotating bell cranks 30 and 32 counter-clockwise. Since the wheels 34 and 36 journalled on the bell cranks 30 and 32 engage the ground, the frame sections to which the rams and bell cranks are swingably secured will be raised relative to the ground; specifically, the bell cranks 30 and 32 rotate on frame section pivots, unnumbered. As the rams 26 and 28 are extended, fluid expelled from the rod ends thereof will pass through conduits 38 and 40 to conduit 42. Solenoid valves 44 and 46 are positioned in conduits 38 and 40 respectively.

In their de-energized position, as shown, the solenoid valves 44 and 46 position a check valve 48 and 50 in conduits 38 and 40 which permits flow only toward the conduit 42. A pilot-operated check valve 52 in conduit 42 normally prohibits flow toward conduit 14. However, the presence of pressure in conduit 12 is communicated through pilot line 54 to open check valve 52. Hence there is a free path for exhaust of fluid from the rod ends of rams 26 and 28 to the tractor reservoir.

When the rams are fully extended, the pressure on the head end side will rise above the normal working pressure. That pressure peak will be communicated through sensor lines 56 and 58 to pressure-actuated electrical switches 60 and 62 respectively, which are normally biased open but close when the pressure exceeds the normal working pressure. The switches 60 and 62 are wired in series to insure that both sections of the frame are fully raised before the electrical circuit of which they are a part is complete. When both switches 60 and 62 close, the relay 64 is actuated, which closes normally open contacts 66 and 68. The closing of contacts 66 energizes the solenoid valves 18, 44 and 46 so that fluid may freely flow in either direction through the associated conduits. Closing the contacts 68 permits the relay 64 to continue to be actuated even after decay of the aforementioned pressure peak, by means of conductors 70 and 72. The conductors 70 and 72 connect with a normally closed switch in counter element 74. The counter element 74 is a mechanical counter which counts the number of revolutions made by the protruding shaft 76 of the rotary flow divider 16.

With the implement now in its raised position and the solenoid valves 18, 44 and 46 actuated, as well as with the relay 64 actuated, the operator can return the implement to its proper working height by shifting the control valve on the tractor to pressurize conduit 14, simultaneously connecting conduit 12 to reservoir. Fluid will be directed to the rod ends of rams 26 and 28 causing them to contract and thereby lower the implement. As the rams contract fluid expelled from the head ends thereof will be directed through conduits 22 and 24 to the rotary flow divider 16. As the flow passes through flow divider 16, the shaft 76 will be rotated. The counter element 74, which may be of the general mechanical type as sold by Veeder-Root Co., will count the revolutions of the shaft 76 and open the normally closed switch in counter element 74 when a predetermined total, related to the distance the implement is to be lowered, is attained. When the switch in counter element opens, the conductor 70 and 72 is broken and the relay 64 is de-energized. This causes the contacts 66 to open, which in turn de-energizes the solenoid valves 18, 44 and 46. These valves are shifted to the positions shown in which the check valves 48 and 50 block flow to the rod ends of the rams 26 and 28 and check valve 20 blocks return of fluid expelled from the head end to the reservoir. Thus, even if the conduit 14 continues to be pressurized, the implement will be positioned and maintained at the proper height.

For road transport of the implement, a different set of transport wheels, not shown, are lowered into contact with the ground which raises the entire implement a greater distance for better clearance during transport. These transport wheels are lowered by extension of a ram 80 which is connected by conduits 82 and 84 to a separate auxiliary valve on the tractor. This arrangement is conventional for large implements. However, to attain the proper clearance the wheels 34 and 36 must be raised beyond their normal operating position, i.e. the rams 26 and 28 must be fully retracted. Raising the wheels 34 and 36 is, of course, equivalent to lowering the implement frame and the switch in the counter element will have been opened because the count total for revolutions of the rotary flow divider 16 will have been reached, de-energizing the solenoid valves 18, 44 and 46 and blocking any further raising of the wheels 34 and 36. A road transport switch 86 is positioned in a conductor 88 which by-passes the switches 60 and 62. When switch 86 is closed the relay 64 is energized and the electrical circuit operates as though these switches 60 and 62 were maintained in their closed position, as described previously.

The markers, not shown, are lowered by gravity and raised by single acting cylinders 90 and 92. A conduit 94 connects with conduit 12 and branches into conduits 96 and 98 to respectively connect with cylinders 90 and 92. Solenoid valves 100 and 102 are positioned in conduits 96 and 98 and when de-energized, as shown, block the conduits with which each is associated, and when energized permit flow therethrough in either direction. The solenoid valves are selectively energized by a switch 104. By connecting the conduit 94 to the conduit 12, the energized marker will be raised by extension of the ram when conduit 12 is pressurized and lowered by gravity when conduit 12 is connected to reservoir. Since high pump flow could operate the markers at too fast a rate, a small orifice 106 is positioned in conduit 94 to restrict the flow to the marker cylinders. A larger orifice 108 is positioned in series with orifice 106 and has little effect on raising the markers, but does control the drop rate or rate at which the markers are lowered, because a check valve 110 is parallel with orifice 106 permits flow toward the conduit 12 to by-pass the smaller orifice 108.

The rotary flow divider 16 is also provided with rephasing valves 112 and 114 which permit the two sets of rams 26 and 28 to be synchronized. That is, if one set of rams should reach the limit of its extension before the other, the flow through that portion of the flow divider supplying pressure to fully extended rams will cause the adjacent rephasing valve 112 or 114 to open and that flow will be directed to the lagging rams. Upon contraction of the rams 26 and 28, the flow expelled from the head ends thereof will be metered through the rotary flow divider 16.

The rotary flow divider 16 also performs the function of assuring a level lift of the implement by metering the flow to and from the conduits 22 and 24. The function and operation of both the rotary flow divider 16 and the rephasing valves 112 and 114 are explained in copending application Ser. No. 156,890 filed June 5, 1980, by W. C. Swanson for "Implement Level Lift System With Rephasing Valves," which application has a filing date and assignee common herewith. The double check valves 116 and 118 are provided in the body of divider 16 to relieve the pressure on the seal around the shaft 76 where it protrudes from that body; the valves 116 and 118 always communicating the seal cavity to the lower pressure one of conduits 12 and 14.

Figure 2:
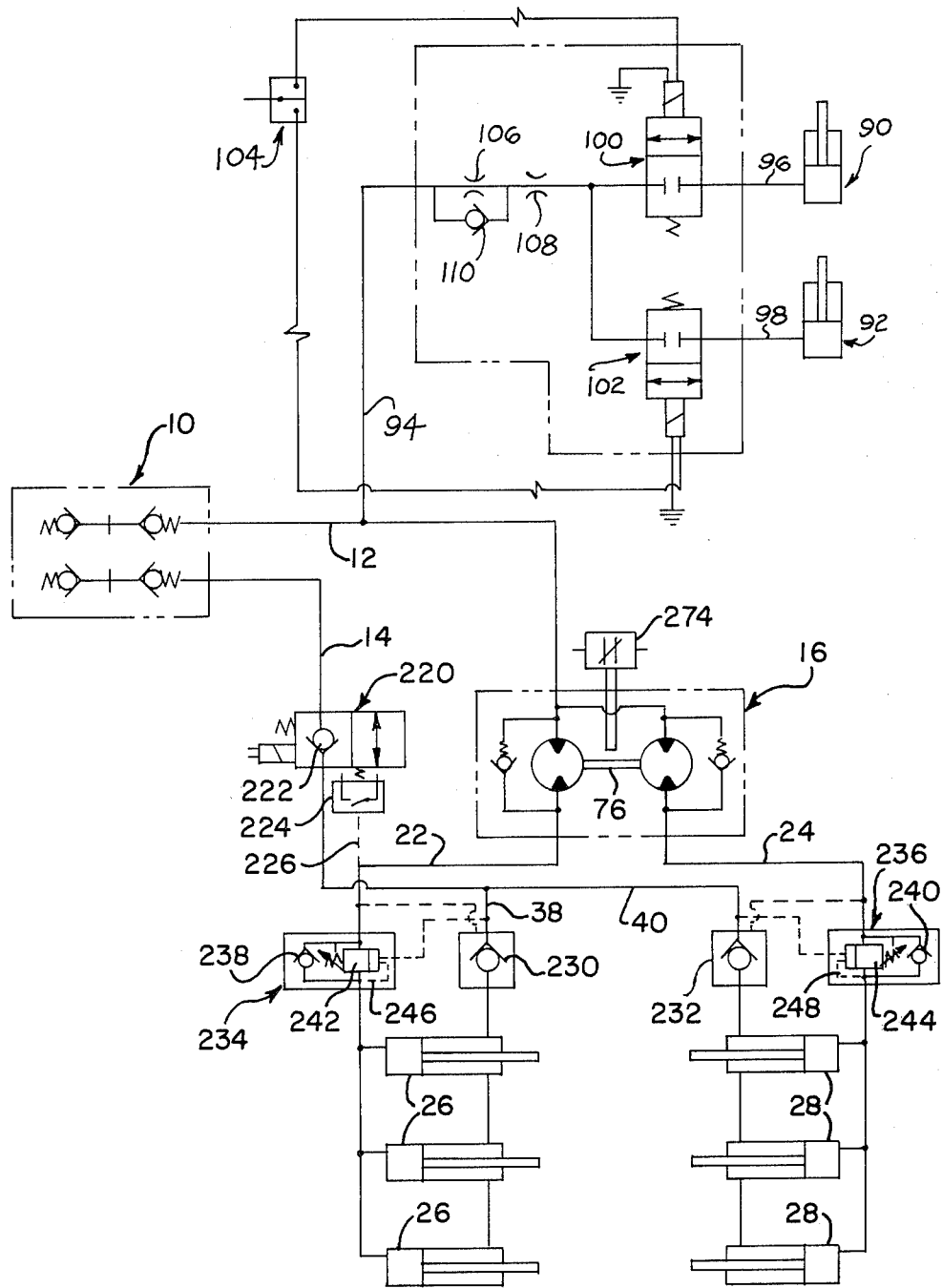

In the FIG. 2 embodiment, the number of solenoid valves has been reduced, a single solenoid valve 220 having a check valve 222 is positioned in conduit 14. When de-energized as shown, the check valve 222 blocks flow toward the rams 26 and 28 and when energized permits free flow in either direction. A single pressure switch 224 is connected by pilot line 226 to the conduit 12 downstream of the rotary flow divider 16 so that it is closed only when flow stops due to both sets of rams 26 and 28 being extended. For simplicity the electrical circuitry has been omitted in FIG. 2, but is essentially the same as in FIG. 1, with the switch 224 replacing switches 60 and 62 and the solenoid of valve 222 replacing those of valves 18, 44 and 46. The counter element 274 is preferably of the type that counts in either direction, so that the normally closed switch therein will be opened on that down count total which was established by the up count total. This could be achieved simply by a lead screw/half-nut arrangement; the half-nut being laterally moved away from the normally closed switch a distance related to rotation of the divider shaft 76 as the implement is raised and then moved back to open this switch, as explained previously.

Hydraulically, pilot-operated check valves 230 and 232 are provided in the conduits 38 and 40 to the rod ends and are opened by pressure through conduits 22 and 24 to the head ends. Counter-balance valves, indicated generally at 234 and 236, are provided in the conduits 22 and 24. These valves assure a smooth, controlled lowering and a rapid raising of the implement. The rapid raise is achieved by the check valves 238 and 240. The controlled lowering is achieved by pilot relief valves 242 and 244 which are piloted from conduits 38 and 40. In order for the relief valves 242 and 244 to open there must be a positive pressure in the conduits 38 and 40. Thus, there is no cavitation and the implement is lowered smoothly. Pilot conduits 246 and 248 function as a thermo-relief by opening the pressure relief valves 242 and 244 whenever expansion of fluid, from the heat of the sun for example, causes a pressure rise in the rams 26 and 28. When these valves are opened, the expanded fluid from the rams may be dispensed to and accommodated by the relatively long lengths of rubber hoses utilized in practice for conduits. Such hoses will swell sufficient to accept the expanded fluid and thereby spare the seals in the rams from potentially damaging excessive pressure.

While two embodiments of the present invention has been shown and described herein, it will be appreciated that various changes and modifications may be made without departing from the spirit of the invention as defined by the scope of the appended claims.

What is claimed is:

1. A flexible frame implement utilizing self-leveling and automatic height control over its level lift system provided for frame sections thereof, comprising:
   at least two frame sections joined for relative angular movement;
   independent hydraulic rams (26, 28) connected to said frame sections for controlling the elevation thereof;
   a rotary flow divider (74) having a protruding shaft (76) adapted to be mechanically connected to, for sensing the revolutions thereof, and further adapted to be hydraulically connected to, in the level lift system;

independent hydraulic connections (22, 24) between the rotary flow divider and each of the rams to afford toothed flow metering, by the rotary flow divider, of fluid flow to and from said rams to maintain a level attitude for the implement;

rotation responsive means (74, 64) including a counter element (74) effective to stop the fluid flow path (40, 42) through said connections to said rams; and a mechanical connection between the protruding shaft (76) of said rotary flow divider and the rotation responsive means (74, 64), enabling the counter element in response to the shaft revolutions being totalled thereby in the rotation response means to stop the fluid flow and halt movement of the rams when said implement is at a desired height.

2. The invention according to claim 1, further comprising:

rephasing valves (112, 114); and connections between the rephasing valves and the rams to assure said rams are synchronized.

3. The invention according to claims 1 or 2, additionally comprising:

solenoid valve means (44, 46) in said fluid flow path (40, 42); and electrical circuit connections between the counter element and the solenoid valve means enabling the counter element, when a predetermined number of revolutions has been totalled thereby, to condition the solenoid valve means to halt said rams.

4. The invention according to claim 1, characterized by:

said counter element comprising a mechanical counter connected whereby said mechanical connection is made between the protruding shaft of the rotary flow divider and said counter element for direct drive of the latter.

5. A flexible frame implement utilizing self-leveling and automatic height control over its level lift system provided for frame sections thereof, comprising:

at least two frame sections joined for relative angular movement;

independent hydraulic rams (26, 28) connected to said frame sections for controlling the elevation thereof;

a rotary flow divider (74) having a protruding shaft (76) adapted to be mechanically connected to, for sensing the revolutions thereof, and further adapted to be hydraulically connected to, in the level lift system;

independent hydraulic connections (22, 24) between the rotary flow divider and each of the rams to afford toothed flow metering, by the rotary flow divider, of fluid flow to and from said rams to maintain a level attitude for the implement;

rotation response means (74, 64) including a counter element (74) effective to stop the fluid flow path (40, 42) through said connections to said rams; and a mechanical connection between the protruding shaft (76) of said rotary flow divider and the rotation responsive means (74, 64) enabling the counter element when a predetermined number of shaft revolutions has been totalled thereby in the rotation responsive means, to stop the fluid flow and halt movement of the rams at a desired height of the implement;

said counter element comprising a mechanical counter connected whereby said mechanical connection is made between the protruding shaft of the rotary flow divider and said counter element for direct drive of the latter.

* * * * *